United States Patent [19]

Eguchi et al.

[11] Patent Number: 5,063,576

[45] Date of Patent: Nov. 5, 1991

[54] CODING AND DECODING METHOD FOR ASYNCHRONOUS DATA SIGNALS AND AN APPARATUS THEREFOR

[75] Inventors: Mikiro Eguchi; Hideto Sato, both of Tokyo, Japan

[73] Assignee: NEC Corporation, Tokyo, Japan

[21] Appl. No.: 458,020

[22] Filed: Dec. 28, 1989

[30] Foreign Application Priority Data

Dec. 28, 1988 [JP] Japan .................. 63-334301

[51] Int. Cl.⁵ .............................................. H04L 7/04
[52] U.S. Cl. .................... 375/111; 370/58.1; 370/100.1; 375/119
[58] Field of Search .................... 375/23, 95, 106, 107, 375/110, 119, 111; 370/58.1, 100.1, 105.3; 371/1

[56] References Cited

U.S. PATENT DOCUMENTS 4,088,832 5/1978 Eastmond .......................... 375/110
4,546,486 10/1985 Evans .................................. 375/110
4,635,277 1/1987 Blake et al. ......................... 375/119
4,819,251 4/1989 Nelson ................................ 375/119

Primary Examiner—Benedict V. Safourek
Attorney, Agent, or Firm—Sughrue, Mion, Zinn, Macpeak & Seas

[57] ABSTRACT

An asynchronous data signal coding and decoding method and implementing apparatus in which data signals, each with a corresponding data timing signal, of a plurality of channels and a plurality of bit rates are supplied to respective input interface circuits. The input interface circuits phase-compare the data timing signals to a reference timing signal of the same frequency, and the thus-obtained phase difference is stored in a first switch circuit for each period of the data timing signal. The corresponding input data signals are processed and synchronized with the reference timing signal and stored in a second switching circuit. Then, the data timing signal is reproduced by using the reference timing signal and the phase difference data. The input data signals, stored in the second switch circuit, are synchronized with the reproduced data timing signals, resulting in a drastic reduction in the quantity of processed data.

13 Claims, 7 Drawing Sheets

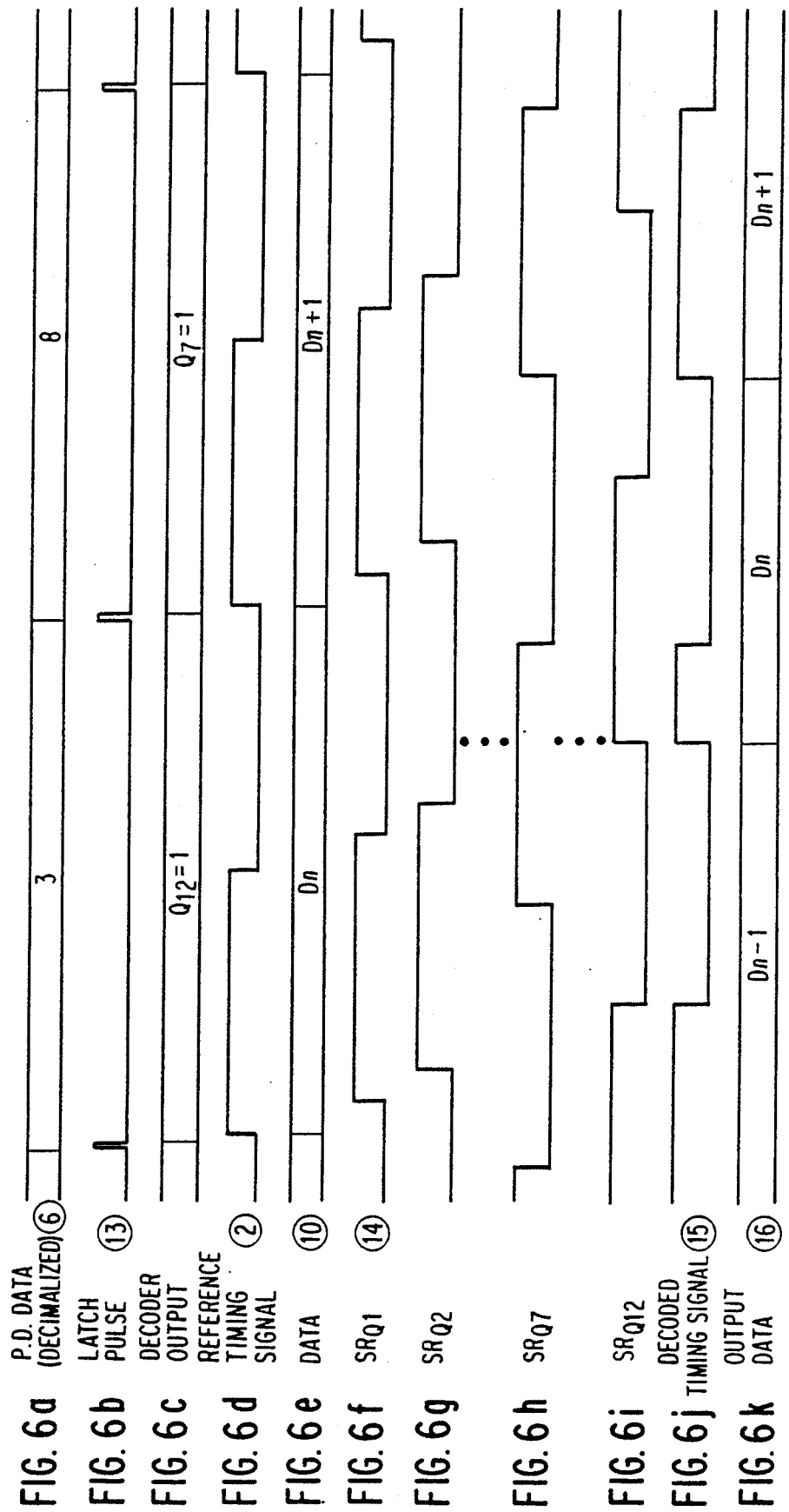

FIG. 7

| COUNTING RESULT | | PHASE DIFFERENCE (°) |
|---|---|---|
| DECIMAL | BINARY | |
| 0 | 0 0 0 0 | $0 \leq \theta < 22.5$ |
| 1 | 0 0 0 1 | $22.5 \leq \theta < 45.0$ |
| 2 | 0 0 1 0 | $45.0 \leq \theta < 67.5$ |
| 3 | 0 0 1 1 | $67.5 \leq \theta < 90.0$ |
| 4 | 0 1 0 0 | $90.0 \leq \theta < 112.5$ |
| 5 | 0 1 0 1 | $112.5 \leq \theta < 135.0$ |
| 6 | 0 1 1 0 | $135.0 \leq \theta < 157.5$ |
| 7 | 0 1 1 1 | $157.5 \leq \theta < 180.0$ |
| 8 | 1 0 0 0 | $180.0 \leq \theta < 202.5$ |
| 9 | 1 0 0 1 | $202.5 \leq \theta < 225.0$ |
| 10 | 1 0 1 0 | $225.0 \leq \theta < 247.5$ |
| 11 | 1 0 1 1 | $247.5 \leq \theta < 270.0$ |
| 12 | 1 1 0 0 | $270.0 \leq \theta < 292.5$ |
| 13 | 1 1 0 1 | $292.5 \leq \theta < 315.0$ |
| 14 | 1 1 1 0 | $315.0 \leq \theta < 337.5$ |
| 15 | 1 1 1 1 | $337.5 \leq \theta < 360.0$ |

FIG. 8

| DECODER INPUT | | | | DECODER OUTPUT | | | | | | | | | | | | | | | |
|---|---|---|---|---|---|---|---|---|---|---|---|---|---|---|---|---|---|---|---|
| $I_4$ | | | $I_1$ | $Q_{15}$ | $Q_{14}$ | $Q_{13}$ | $Q_{12}$ | $Q_{11}$ | $Q_{10}$ | $Q_9$ | $Q_8$ | $Q_7$ | $Q_6$ | $Q_5$ | $Q_4$ | $Q_3$ | $Q_2$ | $Q_1$ | $Q_0$ |
| 1 | 1 | 1 | 1 | 0 | 0 | 0 | 0 | 0 | 0 | 0 | 0 | 0 | 0 | 0 | 0 | 0 | 0 | 0 | 1 |
| 1 | 1 | 1 | 0 | 0 | − | − | − | − | − | − | − | − | − | − | − | − | 0 | 1 | 0 |
| 1 | 1 | 0 | 1 | 0 | − | − | − | − | − | − | − | − | − | − | − | 0 | 1 | 0 | 0 |
| 1 | 1 | 0 | 0 | 0 | − | − | − | − | − | − | − | − | − | − | 0 | 1 | 0 | 0 | 0 |
| 1 | 0 | 1 | 1 | 0 | − | − | − | − | − | − | − | − | − | 0 | 1 | 0 | − | − | 0 |
| 1 | 0 | 1 | 0 | 0 | − | − | − | − | − | − | − | − | 0 | 1 | 0 | − | − | − | 0 |
| 1 | 0 | 0 | 1 | 0 | − | − | − | − | − | − | − | 0 | 1 | 0 | − | − | − | − | 0 |
| 1 | 0 | 0 | 0 | 0 | − | − | − | − | − | − | 0 | 1 | 0 | − | − | − | − | − | 0 |
| 0 | 1 | 1 | 1 | 0 | − | − | − | − | − | 0 | 1 | 0 | − | − | − | − | − | − | 0 |
| 0 | 1 | 1 | 0 | 0 | − | − | − | − | 0 | 1 | 0 | − | − | − | − | − | − | − | 0 |
| 0 | 1 | 0 | 1 | 0 | − | − | − | 0 | 1 | 0 | − | − | − | − | − | − | − | − | 0 |
| 0 | 1 | 0 | 0 | 0 | − | − | 0 | 1 | 0 | − | − | − | − | − | − | − | − | − | 0 |
| 0 | 0 | 1 | 1 | 0 | − | 0 | 1 | 0 | − | − | − | − | − | − | − | − | − | − | 0 |
| 0 | 0 | 1 | 0 | 0 | 0 | 1 | 0 | − | − | − | − | − | − | − | − | − | − | − | 0 |
| 0 | 0 | 0 | 1 | 0 | 1 | 0 | − | − | − | − | − | − | − | − | − | − | − | − | 0 |
| 0 | 0 | 0 | 0 | 1 | 0 | 0 | 0 | 0 | 0 | 0 | 0 | 0 | 0 | 0 | 0 | 0 | 0 | 0 | 0 |

CODING AND DECODING METHOD FOR ASYNCHRONOUS DATA SIGNALS AND AN APPARATUS THEREFOR

BACKGROUND OF THE INVENTION

The present invention relates to a method and apparatus for encoding asynchronous data signals for data processing and also a method and apparatus for decoding the encoded signals produced by the encoder apparatus.

With the diversification of communications networks in recent years, demand has been on the increase for data processors which are capable of attending to asynchronous data signals having unequal bit rates and phases. In such a processor apparatus, input data signals are processed after they are converted (coded) to code sequences or the like since it is not possible to synchronize each and every input data signal.

The multipoint sampling is a technique for coding data signals in which a plurality of input data signals are sampled with a high-speed common clock and converted to code sequences having an identical speed to be given a desired processing. After processing, the code sequences of the sample data are decoded.

While the multipoint sampling has an advantage that an encoder can be simply constructed with an AND gate which assigns one of the inputs to the data and the other to the sampling clock, it also has the disadvantage of an increase in the sample data involved in the increasing of the sampling frequency, which contributes to the reduction of a phase difference between an original signal and decoded signal. For example, assuming that an input data signal with a bit rate fo is sampled with a sampling clock signal with a frequency of 16 fo, the quantity of data to be processed amounts to 16 times that of the original data. The sample data increase necessarily leads to such problems as an increase in the size of the apparatus for processing the data and a reduction in the processing speed.

SUMMARY OF THE INVENTION

It is an object of the invention to provide a coding and decoding method for asynchronous data signals which produces a decoded data having a smaller phase difference from the original data and reduces the amount of coded data.

It is another object of the present invention to provide an asynchronous data processing apparatus which has a simple hardware structure.

According to the present invention, a coding and decoding method for a digital data signal having a predetermined data rate, transmitted through a transmission line together with a data timing signal timed to the digital data signal, the coding and decoding method comprising the steps of:

detecting the phase difference between the data timing signal and a reference timing signal having the identical frequency as that of the data timing signal to produce a phase difference signal;

comparing the phase difference data with a predetermined value to produce a comparison result;

detecting a rise edge and a fall edge of the reference timing signal;

taking in the digital data signal at either one of the rise edge or fall edge in accordance with the comparison result to produce a synchronized data signal with the reference timing signal;

decoding the phase difference signal using the reference timing signal to produce a decoded data timing signal; and decoding, in response to the decoded data timing signal, the synchronized data signal to produce a decoded data signal.

In the present invention, the phase difference with respect to reference timing pulses having an identical frequency is detected for every period of the timing signal (data timing signal) of the input data, and the phase difference data that represents the phase difference and the corresponding input data are and synchronized with the reference timing signal. Then, the data timing signal is reproduced by using the reference timing signal and the phase difference data, and a drastic reduction in the quantity of data to be processed is achieved by outputting the data synchronized with the reproduced data timing pulses. For example, when multipoint sampling of input data having data timing pulses of frequency fo is executed, in which a phase difference between an original data and the decoded data of 1/16 fo at the worst is desired, it is necessary to sample the data using sampling pulses with frequency of 16 fo. This means that there are generated 16 bits of data to be processed for 1 bit of input data. On the other hand, assuming the maximum phase difference of 360° between the timing signal of the input data and the reference timing signal, it is only necessary to subdivide the phase difference into 16 stages of 22.5° each. Since the value of 16 stages can be represented using 4 bits, a total of 5 bits, namely, the sum of the input data (1 bit) and the phase difference data (4 bits), suffice for the processing data, indicating a reduction of 16−5=11 bits.

BRIEF DESCRIPTION OF THE DRAWINGS

The above and other objects, features and advantages of the present invention will become apparent from the following detailed description when taken with accompanying drawings in which:

FIGS. 6a to 6k are timing charts for illustrating the operation of the circuit in FIG. 5;

FIG. 7 is an example of concrete correspondence between the counted value and the phase difference in FIG. 2; and FIG. 8 is a concrete example of the decoder input and output for a decoder in FIG. 5.

DETAILED DESCRIPTION OF THE PREFERRED EMBODIMENT

Figure 1:
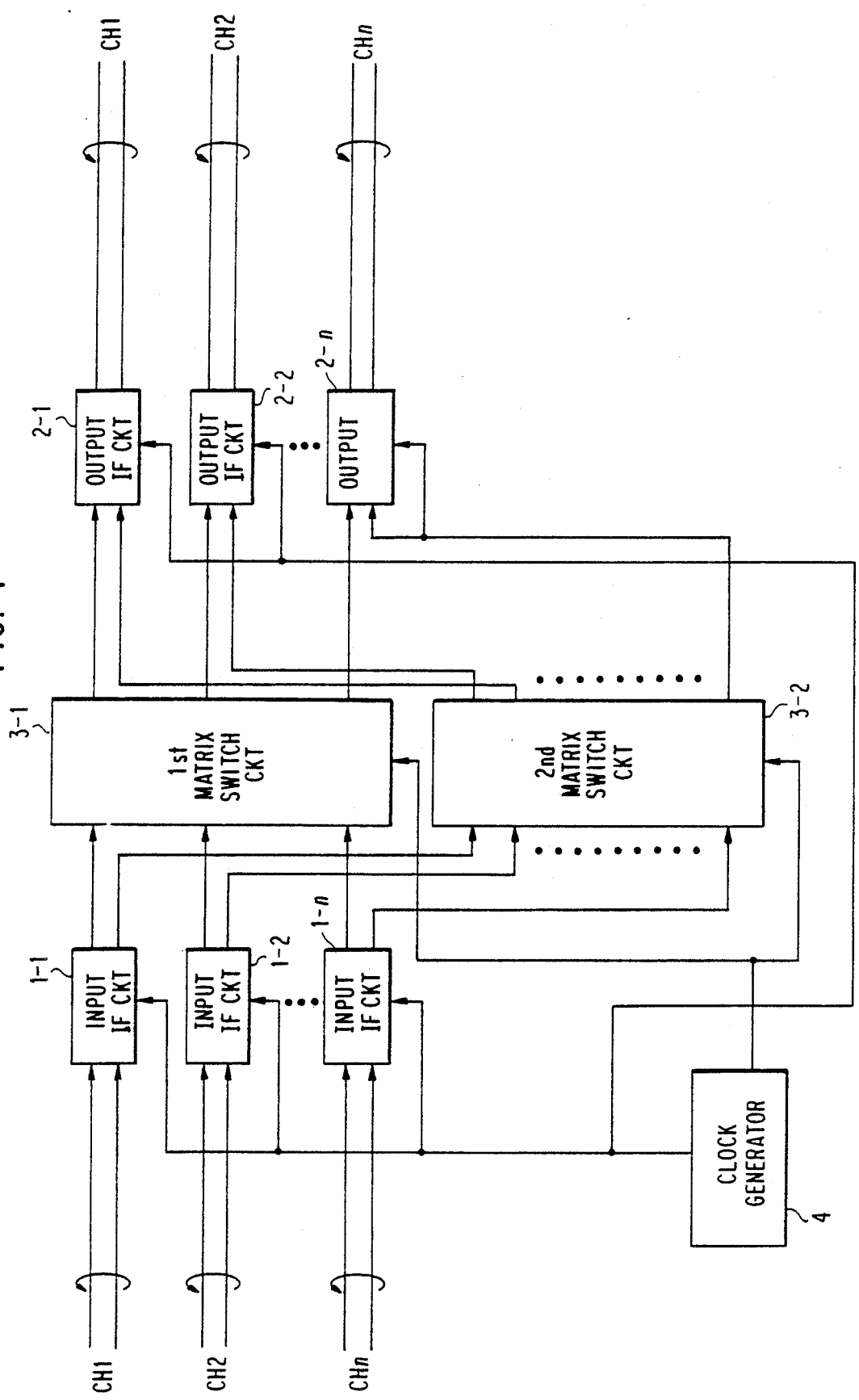
FIG. 1 is a block diagram of a matrix switch apparatus implementing the present invention.

FIG. 1 is a block diagram of an embodiment of the invention implementing with a matrix switch apparatus which is one of processors. The matrix switch apparatus has n pairs of lines each for the input and the output channels, each channel consisting of a data line and a data timing signal line. To facilitate the description and the understanding, it will be assumed that the input and the output channels have an equal bit rate of $f_0$. Asynchronous data signals and their data timing signals are input to corresponding input interface (IF) circuits 1-1 to 1-n. Each of the input IF circuits detects a phase difference between the data timing signal and a reference timing signal for each period, and provides phase difference data to a first matrix switch circuit 3-1. In response to the data signal, the input IF circuit also functions to produce a synchronous data signal which timed with a reference timing signal and provides it to a second matrix switch circuit 3-2. It should be noted that the supply of the phase difference data to the first matrix switch 3-1 is made during a data bit period of the synchronous data signal associated with the phase difference data. The first and second matrix switch circuits 3-1 and 3-2 are controlled by control means (not shown) and switch sets of the data signals and the phase difference data signal in a time division manner to supply them to predetermined output channels. Since the operation of such matrix switch circuits 3-1 and 3-2 is generally well known, further description will be omitted.

Output interface (IF) circuits 2-1 to 2-n are provided corresponding to the respective output lines to reproduce a data timing signal based on the phase difference data signal from the first matrix switch circuit 3-1, and to output a data signal synchronized with the reproduced timing signal. A clock generator 4 generates various kinds of clock pulses needed for operating the matrix switch apparatus.

Figure 2:
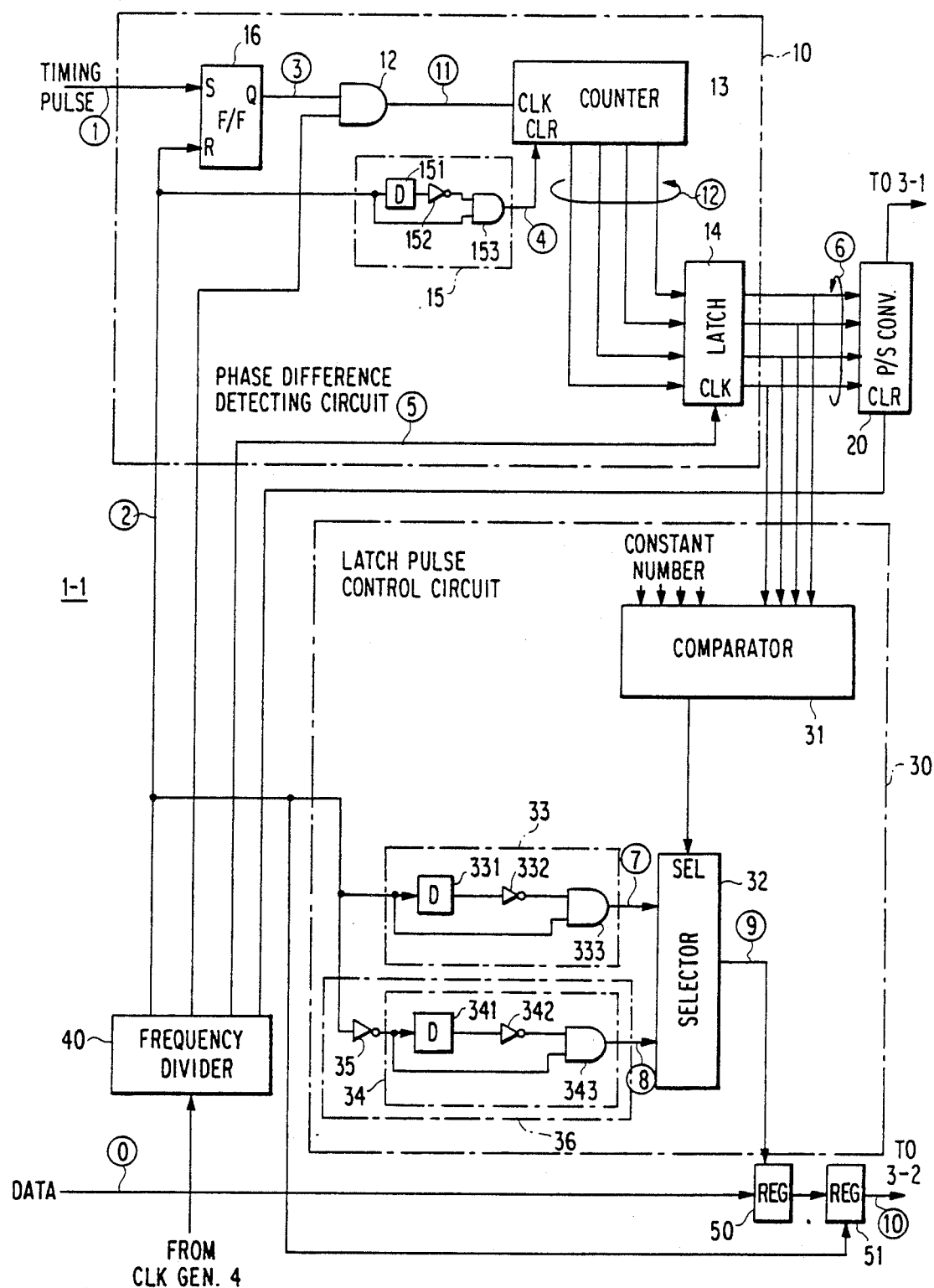
FIG. 2 is a block diagram of an input interface circuit used in FIG. 1.

FIG. 2 is a circuit diagram of the input interface circuit in FIG. 1. As shown in FIG. 2, the input interface circuit includes a phase difference detecting (PDD) circuit 10 and a latch pulse control circuit 30, a parallel to serial (P/S) converter 20, a frequency divider 40 for generating various timing signals necessary for the operation of the circuit based on the clock pulses from the clock generator 4, a register 50 for latching the data signal, and another register 51 for adjusting the supply of the data signal to the matrix switch circuit 3-2.

The PDD10 detects phase differences between the data timing signal of the corresponding channel and the reference timing signal which has the same frequency fo as that of the data timing signal and is supplied from the frequency divider 40, and outputs values (phase difference data) corresponding to the phase differences.

The P/S converter 20 converts a parallel phase difference data signal supplied from the PDD10 to a serial data according to the clock from the frequency divider 40 and supplies the serial data to the first matrix switch circuit 3-1. Since the phase difference data in the embodiment is assigned 4 bits, the clock for S/P conversion has a bit rate of 4 (bits)×n (channels)×fo=4 nfo. In the event that the first matrix switch circuit 3-1 is capable of processing the 4-bit parallel data for each of the input channels, the P/S converter 20 can be spared.

The latch pulse control circuit 30 generates a latch pulse in response to the phase difference data and the reference timing signal. The timing of the latch pulse is adjusted such that the data can be registered at a suitable timing during a data bit period.

Referring to the time charts in FIGS. 3a to 3m, the operation of the input interface circuit in FIG. 2 will be described in more details. In FIGS. 3a to 3m, reference symbols zero to twelve show the waveforms or values on the signal lines with the corresponding symbols in FIG. 2.

Figure 3:
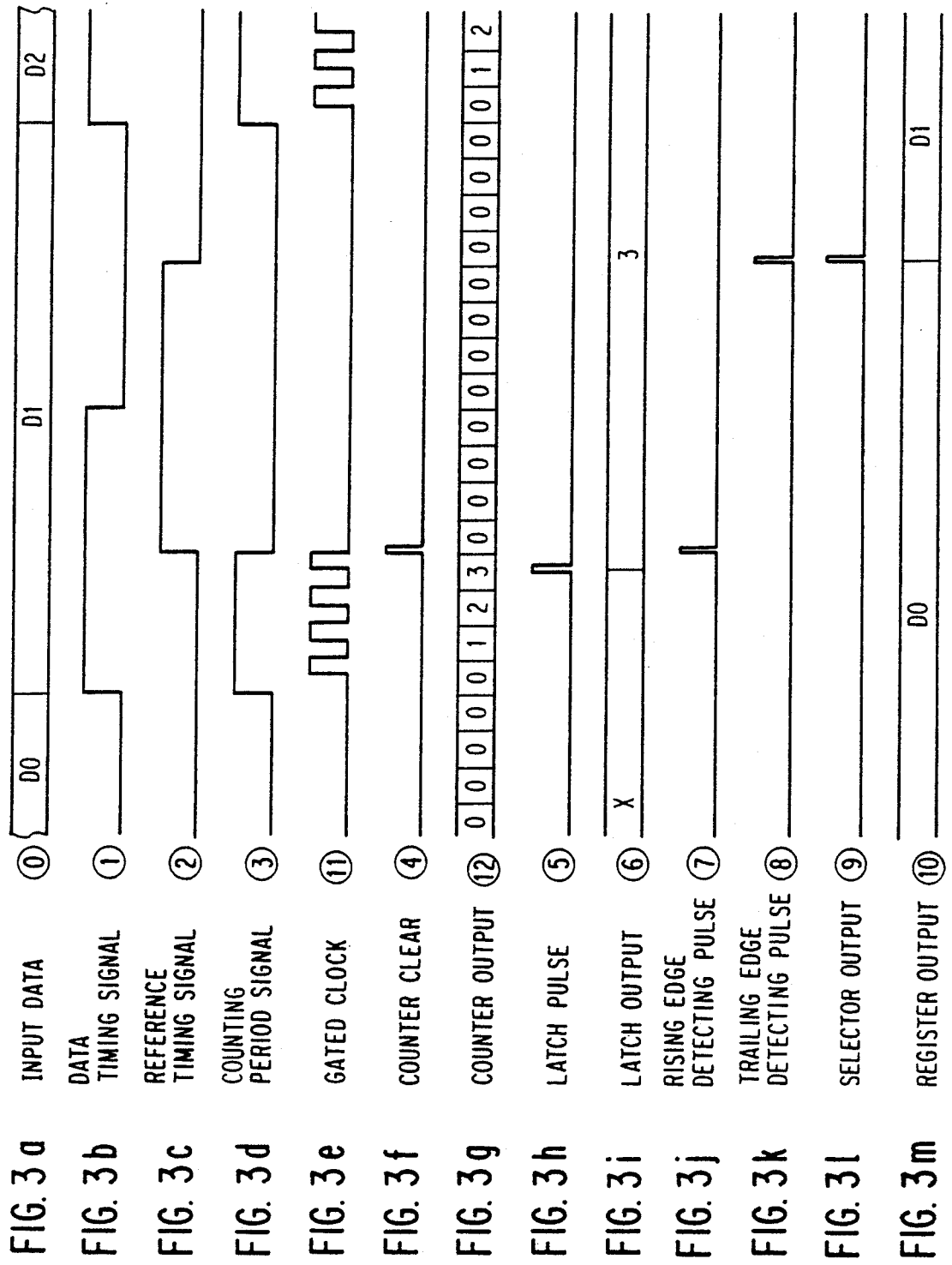
FIGS. 3a to 3m and FIGS. 4a to 4m are timing charts showing the operation of the circuit in FIG. 2.

A data timing signal (FIG. 3b) in synchronism with an input data signal (FIG. 3a) is input to a set terminal of a set-reset flip-flop (F/F) 16 which constitutes the PDD10, and reference timing signal (FIG. 3c) is applied to a reset terminal of the F/F 16. In response to the rise transitions of these timing signals, the F/F 16 outputs a counting period signal which has a high level for the period from a rise edge of the data timing signal to a rise edge of the reference timing signal, namely, for the period corresponding to the phase difference between these signals, as shown in FIG. 3d. An AND gate 12 receives the counting period signal to one of the terminals and the counting clock pulses for phase difference measurement to the other terminal, and outputs the number of counting clock pulses that corresponds to the counting period signal (FIG. 3e). The counting clock pulse corresponds to the sampling clock in the multi-point sampling, and is sufficiently high speed. In the present embodiment, it is assumed that the clock rate is 16 times that of the data timing signal. A counter 13 counts the gated counting clock pulses to produce a value that represents the phase difference. A correspondence relation between the value of the counter 13 and the phase difference is shown in FIG. 7.

The counter 13 comprises a 4-bit binary counter which is reset for every 16-pulse counts. The phase difference data (FIG. 3g) is latched (FIG. 3i) by a latch 14 with a latch pulse (FIG. 3h) from the frequency divider 40 immediately before the completion of the phase difference counting period. With the completion of the counting period, a counter clear circuit 15 generates a counter clear pulse (FIG. 3f) to clear the counter 13.

The counter 13 begins counting with the start of the next counting of the phase difference. The counter clear circuit 15 comprises a delay element 151 which provides a delay of one period of the reference timing signal, an inverter 152, and an AND gate 153. The counter clear circuit 15 supplies the counter clear pulses which represents the rise edges of the reference timing signal and have a width equal to the gate delay of the inverter 152.

The latched phase difference data is provided to the P/S converter 20 which supplies the serial data to the first matrix switch 3-1 and, at the same time, feeds to a comparator 31 where the phase difference data is compared with a predetermined constant which is assumed to be "3" (0011). The comparator 31 outputs a selection signal "1" if the phase difference data is larger than "3" (0011) and "0" if it is equal to or smaller than "3" (0011).

The latch pulse control circuit 30 for the register 50 includes a rise edge detecting circuit 33 which detects the rise edges of the reference timing signals to produce rise edge detecting pulses (FIG. 3j), and a fall edge detecting circuit 36 which detects the fall edge of the reference timing signal to produce fall edge detecting pulses (FIG. 3k). The fall edge detecting circuit 36 includes an inverter 35 and a circuit 34 which has an arrangement similar to the rise edge detecting circuit 33. A selector 32 selects as a latch pulse for the register 50 any of the rise and fall edge pulse in accordance with the selection signal from the comparator 31. Specifically, the selector 32 outputs, for example, a first pulse i.e., rise edge detecting pulse if the selection signal is "1" and a second pulse i.e., fall edge detecting pulse if it is "0".

Thus, the register 50 latches the data at the fall and rise edges of the reference timing signal depending upon whether the phase difference is larger than 90° or equal to or smaller than 90°, respectively. The controlled latch pulse provide the function of secure data taking in. In FIGS. 3a to 3m, the latch pulse (FIG. 3l) comprises the second pulse (FIG. 3k). On the other hand, in FIGS.

Figure 4:
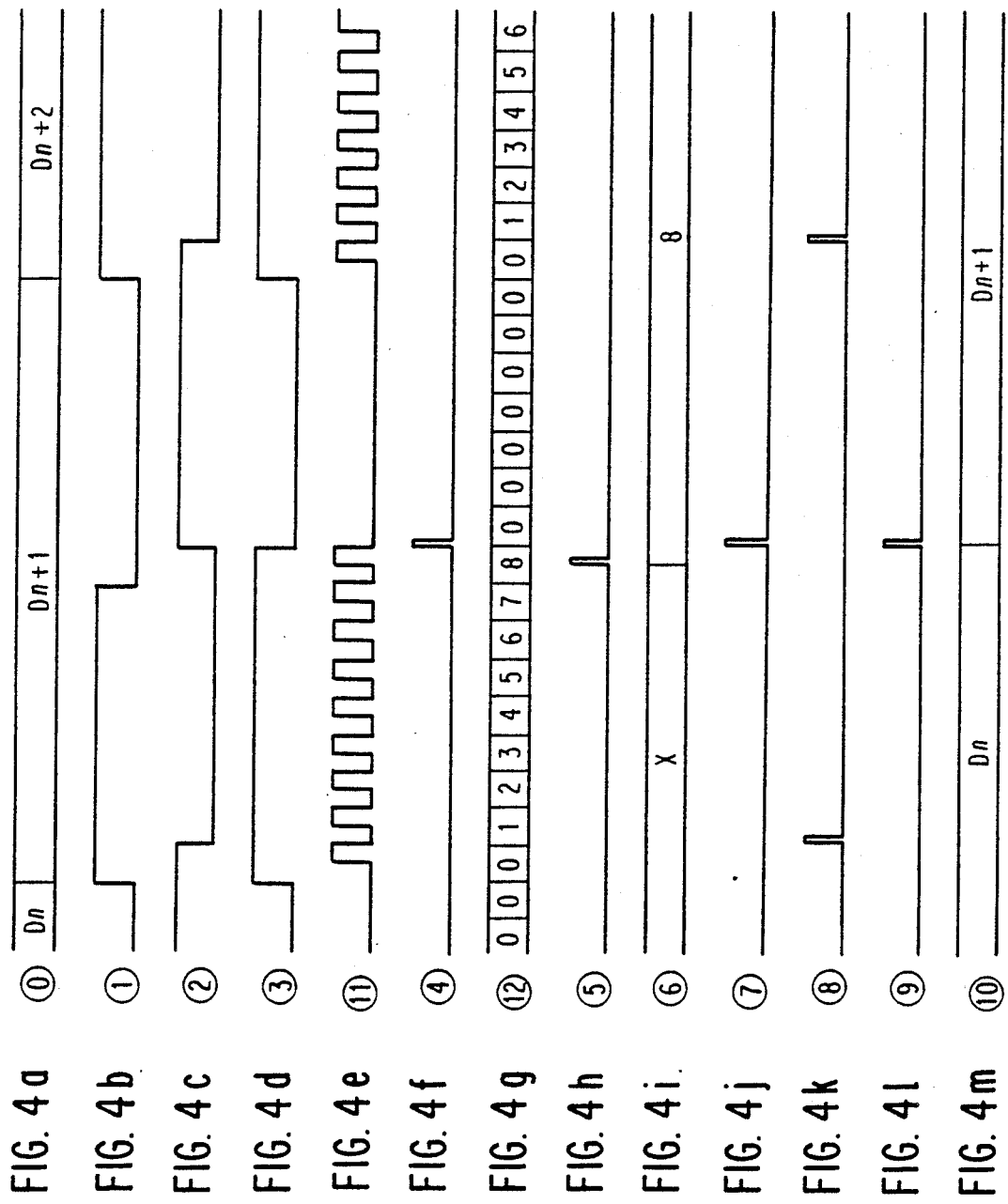

4a to 4m illustrating phase difference data of "8" (1000) representative of a phase difference larger than 90°, the latch pulse (FIG. 4l) comprises the first pulse (FIG. 4j).

The data taken into the register 50 is again latched in synchronism with the reference timing signal into the register 51 whose output is supplied to the 2nd matrix switch circuit 3-2.

The data signals and their phase difference data from the respective channels are switched in a time division fashion by the matrix switch circuits 3-1 and 3-2, and are provided to output interface (IF) circuits 2-1 to 2-n for the respective output channels.

Figure 5:
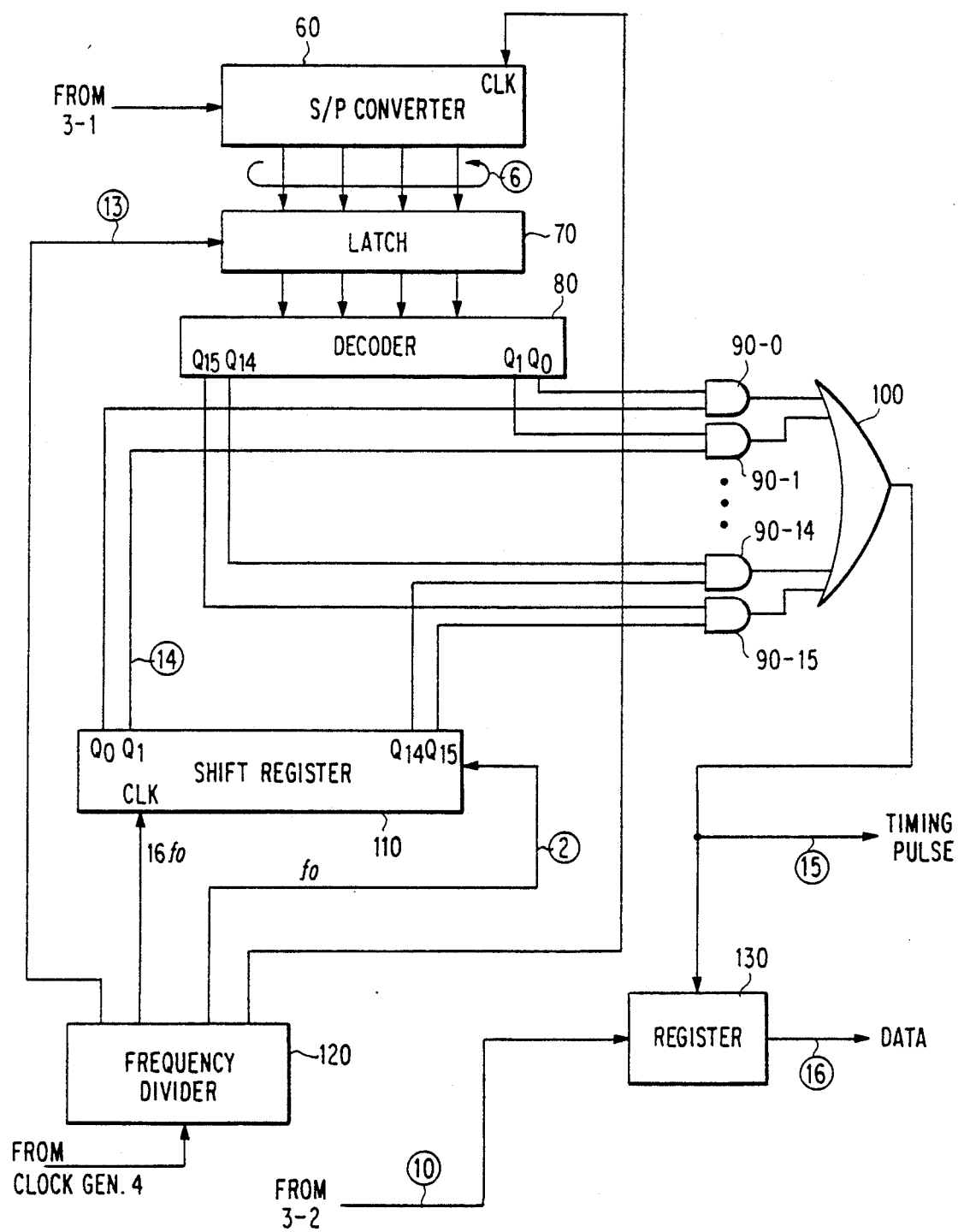
FIG. 5 is a circuit diagram of an output interface circuit used in FIG. 1.

FIG. 5 shows an output interface (IF) circuit 2-1. The output IF circuit comprises an S/P converter 60 which converts a serial phase difference data from the 1st matrix switch circuit 3-1 to 4-bit parallel data. The S/P converter 60 is driven by the clock that is synchronized with that of the P/S converter 20 in the input IF circuit 1-1. After an S/P conversion, the phase difference data is latched in a latch 70, and is given to a decoder 80 which has, for example, a ROM, and signals out only one of 16 output lines depending upon the 4-bit phase difference data. The truth table specification for the decocer 80 is illustrated in FIG. 8. The decoder 80 outputs are applied to AND gates 90-0 to 90-15, which also receive the outputs $Q_0$ to $Q_{15}$ of a 16-bit shift register 110. The shift register 110 receives a reference timing signal with a frequency of fo from a frequency divider 120, and shifts the level of the reference timing signal from $Q_0$ to $Q_{15}$ terminals with 16 shift clock pulses with a frequency of 16 fo which are supplied from the frequency divider 120. Thus, OR gate 100 which is coupled to the AND gates 90-0 to 90-15 outputs a decoded timing signal at a time determined by the decoder output. The decoded timing signal is used as a data timing signal as well as a latch pulse for a register 130.

Referring to FIGS. 6a to 6k, the operation of the output IF circuit in FIG. 5 will be described. A phase difference data from the matrix switch circuit is brought back to parallel data (FIG. 6a) by the S/P converter 60 which is latched into the latch 70 with the latch pulse (FIG. 6b) from the frequency divider 120. In response to such parallel data, the decoder 80 identifies only one output line (FIG. 6c). As is clear from FIG. 6a and FIG. 8, the decoder outputs "0011"("3" is decimal) which sets $Q_{12}$="1" while all other outputs are at logic "0". Thus, only the AND gate 90-12 is activated. As a result, the OR gate 100 supplies a reference timing signal(FIG. 6i) which is delayed by a time equal to 12/16 (=$\frac{3}{4}$) period to the register 130 which latches the data (FIG. 6k) from the 2nd matrix switch circuit 3-2.

Since the phase difference data varies for every cycle of the data, the cycle of the decoded data timing signal (FIG. 6j) is not necessarily constant. However, the synchronization with the output data is maintained, and the phase difference with the original data prior to the coding also has the same accuracy as in the case of the multipoint sampling with the frequency of 16 fo.

As may be evident from the description in the above, the present invention achieves a drastic cut in the quantity of processing data compared with the conventional multipoint sampling method by detecting a phase difference between a reference timing signal within an apparatus and a data timing signal for each channel, encoding the phase difference to a code, processing the latched data signal with the code, and then reproducing the original data and it's data timing signal based on the code and the latched data.

It should be noted that in the present embodiment it has been assumed that the data rates of the input and the output channels are equal for the ease of understanding. However, it should be obvious that the present invention can be adapted to a plurality of asynchronous data having various data rates by providing a means for generating various reference timing signals with frequency equal to that of the data timing signals in the input interface circuit and the output interface circuit for each channel.

Moreover, in this embodiment, two matrix switch circuits 3-1 and 3-2 are used for switching phase difference data and latched data, respectively. However, multiplexing the phase difference data and the latched data into as a encoded data, for example, makes removing one of the matrix switch circuits possible.

What is claimed is:

1. A coding and decoding apparatus for digital data signals having a predetermined data rate, transmitted through input lines together with data timing signals timed to the digital data signals, said coding and decoding apparatus comprising an input interface circuit means provided corresponding to said input lines, switching means connected to said input interface circuit means, for exchanging said data signals and outputting exchanged data signals to output lines, output interface circuit means provided corresponding to said output lines, wherein said input interface circuit means comprises:

reference timing signal generating means for generating a reference timing signal having a frequency equal to that of the data timing signal;
    phase difference detecting means for detecting the phase difference between said data timing signal and said reference timing signal and outputting a phase difference data signal that represents the phase difference;
    comparator means for outputting the result of a comparison between said phase difference data signal and a predetermined value;
    rising edge detecting means for generating a first detection signal upon detecting the rising edge of said reference timing signal;
    trailing edge detecting means for generating a second detection signal upon detecting the trailing edge of said reference timing signal;
    selector means for selecting and outputting either one of said first or second detection signals as a writing pulse in response to said result of comparison; and
    first register means for storing said digital data signal in accordance with said writing pulse and for outputting said stored digital data signal, and wherein said output interface circuit means comprises:
    delay information generating means for generating delay information representative of a delay corresponding to the phase difference data signal received from the switching means;
    variable delay circuit means for delaying the reference timing signal in response to the delay information and for outputting the delayed reference timing signal as a reproduced data timing signal; and
    second register means for outputting the digital data received from the switching means synchronized with the reproduced data timing signal.

2. A coding and decoding apparatus according to claim 1, wherein said reference timing signal generating means includes a frequency divider means for frequency dividing a clock signal to produce said reference timing signal having one of a plurality of frequencies.

3. A coding an decoding apparatus according to claim 1, wherein said phase difference detecting means includes a flip-flop circuit for designating a phase difference period.

4. A coding an decoding apparatus according to claim 3, wherein said phase difference detecting means further includes a counter circuit for determining the magnitude of said phase difference period.

5. A coding and decoding apparatus according to claim 1, wherein said variable delay circuit means includes a shift register circuit for varying a delay in the outputting of said delayed reference timing signal.

6. A coding and decoding apparatus according to claim 5, wherein said variable delay circuit means further includes combinational logic means for holding said delay information generated by said delay information generating means and outputting said delayed reference timing signal as said reproduced data signal when said delayed reference timing signal is received by said combinational logic means.

7. A coding and decoding method for a digital data signal having a predetermined data rate, transmitted through a transmission line together with a data timing signal timed to the digital data signal, said coding and decoding method comprising the steps of:
    detecting the phase difference between said data timing signal and a reference timing signal having the same frequency as that of said data timing signal to produce a phase difference signal;
    comparing said phase difference signal with a predetermined value to produce a comparison result;
    detecting a rise edge and a fall edge of said reference timing signal;
    sampling said digital data signal at either one of said rise edge or fall edge in accordance with said comparison result to produce a synchronized data signal synchronized with said reference timing signal;
    decoding said phase difference signal using said reference timing signal to produce a decoded data timing signal; and
    decoding, in response to said decoded data timing signal, said synchronized data signal to produce a decoded data signal.

8. A coding and decoding method according to claim 7, wherein said decoding said phase difference signal step involves varying the length of a delay of said reference timing signal.

9. A coding an decoding apparatus for a digital data signal having a predetermined data rate, transmitted through a transmission line together with a data timing signal timed to the digital data signal, said coding and decoding apparatus comprising:
    phase difference detecting means for detecting the phase difference between said data timing signal and a reference timing signal having the identical frequency as that of said data timing signal to produce a phase difference signal;
    comparing means for comparing said phase difference signal with a predetermined value to produce a comparison result;
    edge detecting means for detecting a rise edge and a fall edge of said reference timing signal;
    latching means for latching said digital data signal at either one of said rise edge or fall edge in accordance with said comparison result to produce a synchronized data signal synchronized with said reference timing signal;
    first decoding means for decoding said phase difference signal using said reference timing signal to produce a decoded data timing signal; and
    second decoding means for decoding, in response to said decoded data timing signal, said synchronized data signal to produce a decoded data signal.

10. A coding method for a digital data signal having a predetermined data rate, transmitted through a transmission line together with a data timing signal timed to the digital data signal, said coding method comprising the steps of:
    detecting the phase difference between said data timing signal and a reference timing signal having the identical frequency as that of said data timing signal to produce a phase difference signal;
    comparing said phase difference signal with a predetermined value to produce a comparison result;
    detecting a rise edge and a fall edge of said reference timing signal;
    sampling said digital data signal at either one of said rise edge or fall edge in accordance with said comparison result to produce a coded data signal synchronized with said reference timing signal; and
    transmitting said coded data signal together with said phase difference signal.

11. A decoding method for a coded data signal sent with a phase difference signal which represents a phase difference associated with the coded data signal, said decoding method comprising the steps of:
    decoding said phase difference signal to produce a decoded phase difference signal;
    delaying a reference clock pulse signal having a predetermined frequency by a time representative of said decoded phase difference signal to produce a decoder timing signal; and
    decoding said coded data signal to produce a decoded data signal, in response to said decoder timing signal.

12. A coding apparatus for a digital data signal having a predetermined data rate, transmitted through a transmission line together with a data timing signal timed to the digital data signal, said coding apparatus comprising:
    phase difference detecting means for detecting the phase difference between said data timing signal and a reference timing signal having the identical frequency as that of said data timing signal to produce a phase difference signal;
    comparing means for comparing said phase difference signal with a predetermined value to produce a comparison result;
    edge detecting means for detecting a rise edge and a fall edge of said reference timing signal;
    latching means for latching said digital data signal at either one of said rise edge or fall edge in accordance with said comparison result to produce a coded data signal synchronized with said reference timing signal; and
    transmitting means for transmitting said coded data signal together with said phase difference signal.

13. A decoding apparatus for a coded data signal sent with a phase difference signal which represents a phase difference associated with said coded data signal, said decoding apparatus comprising:

first decoder means for decoding said phase difference signal to produce a decoded phase difference signal;

delay means for delaying a reference timing signal having a predetermined frequency by a time representative of said decoded phase difference signal to produce a decoder timing signal; and second decoder means for decoding said coded data signal to produce a decoded data signal, in response to said decoder timing signal.

* * * * *

UNITED STATES PATENT AND TRADEMARK OFFICE
CERTIFICATE OF CORRECTION

PATENT NO. : 5,063,576

DATED : November 5, 1991

INVENTOR(S) : Eguchi et al

It is certified that error appears in the above-identified patent and that said Letters Patent is hereby corrected as shown below:

Col. 2, line 14 after "are", insert --processed--.

Col. 3, line 62, delete "zero to twelve" and insert -- ⓪ to ⑫ --.

Signed and Sealed this

Twentieth Day of April, 1993

*Attest:*

MICHAEL K. KIRK

*Attesting Officer*       *Acting Commissioner of Patents and Trademarks*